United States Patent [19]

Christy

[11] Patent Number: 5,405,536

[45] Date of Patent: * Apr. 11, 1995

[54] PROCESS AND APPARATUS FOR PATHOGEN REDUCTION IN WASTE

[75] Inventor: Paul G. Christy, Devon, Pa.

[73] Assignee: RDP Company, Plymouth Meeting, Pa.

[*] Notice: The portion of the term of this patent subsequent to May 7, 2008 has been disclaimed.

[21] Appl. No.: 98,638

[22] Filed: Jul. 28, 1993

Related U.S. Application Data

[60] Continuation-in-part of Ser. No. 954,657, Sep. 30, 1992, Ser. No. 654,781, Feb. 13, 1991, abandoned, and Ser. No. 654,789, Feb. 13, 1991, abandoned, each is a continuation of Ser. No. 505,938, Apr. 6, 1990, Pat. No. 5,013,458, said Ser. No. 954,657, is a division of Ser. No. 749,988, Aug. 26, 1991, Pat. No. 5,186,840.

[51] Int. Cl.$^6$ .................. C02F 11/14; C02F 11/18
[52] U.S. Cl. .................. 210/710; 210/751; 210/764
[58] Field of Search .............. 210/751, 764, 742, 710; 366/146, 147, 79

[56] References Cited

U.S. PATENT DOCUMENTS

| | | | |
|---|---|---|---|
| 2,297,195 | 9/1942 | Behringer . | |
| 2,723,954 | 11/1955 | Young . | |
| 3,109,913 | 11/1963 | Galajda, Jr. . | |
| 3,267,524 | 5/1966 | Morse | 366/79 |
| 3,589,834 | 6/1971 | Cairelli | 416/95 |
| 3,793,841 | 2/1974 | Dozsa . | |
| 3,866,669 | 2/1975 | Gardiner | 366/79 |
| 3,884,607 | 5/1975 | Gerhards | 425/144 |
| 4,028,240 | 6/1977 | Manchak, Jr. | 210/751 |
| 4,043,904 | 8/1977 | Endo et al. | 366/297 |
| 4,048,472 | 9/1977 | Sauer et al. | 366/146 |
| 4,118,243 | 10/1978 | Sandesara . | |
| 4,152,076 | 5/1979 | Driskill | 366/79 |
| 4,190,372 | 2/1980 | Takagi et al. | 366/153 |
| 4,197,070 | 4/1980 | Koschmann | 366/79 |
| 4,270,279 | 6/1981 | Roediger | 210/609 |
| 4,295,972 | 10/1981 | Kamei | 210/710 |
| 4,306,978 | 12/1981 | Wurtz . | |
| 4,369,111 | 1/1983 | Roediger . | |
| 4,385,883 | 5/1983 | Hanslik | 366/83 |
| 4,443,109 | 4/1984 | Watts | 366/153 |
| 4,460,470 | 7/1984 | Reimann . | |
| 4,474,479 | 10/1984 | Redelman | 366/297 |
| 4,514,307 | 4/1985 | Chestnut et al. | 210/751 |
| 4,541,986 | 9/1985 | Schwab et al. | 210/764 |
| 4,597,872 | 7/1986 | Andersson et al. . | |
| 4,614,587 | 9/1986 | Andersson et al. . | |
| 4,632,759 | 12/1986 | Andersoon et al. . | |
| 4,659,471 | 4/1987 | Molin et al. . | |

(List continued on next page.)

FOREIGN PATENT DOCUMENTS 835216 3/1955 United Kingdom .

OTHER PUBLICATIONS

Wallace & Tiernan, Paste-Type Lime-Slaking Systems, Sep. 1989.

Berman, Lime Stabilization/Pasteurization vs. Traditional Methods, Jun. 1989.

(List continued on next page.)

*Primary Examiner*—Neil McCarthy
*Attorney, Agent, or Firm*—Paul & Paul

[57] ABSTRACT

Process for pathogen reduction in waste where dewatered sludge having a solids content in the range of 10–60% is mixed with a selected alkaline additive selected from the group consisting of calcium oxide or calcium carbonate group. Hydration to calcium hydroxide occurs with an attendant release of heat. The pH of the sludge is then elevated and the heat of the hydration reaction is retained. Supplemental heat is added to the sludge, either to preheat the sludge prior to mixing it, or while mixing it, or both, such that effective neutralization of pathogens results. The supplemental heat is added by indirectly heating the sludge by heat generated by electric elements carried either in the mixing member, or by the chamber, or both, with electric power being supplied from outside the chamber.

15 Claims, 2 Drawing Sheets

U.S. PATENT DOCUMENTS

| | | |
|---|---|---|
| 4,659,472 | 4/1987 | Norlund et al. . |
| 4,663,043 | 5/1987 | Molin et al. . |
| 4,709,003 | 3/1978 | Manchak . |
| 4,710,032 | 12/1987 | Nordlund . |
| 4,760,650 | 8/1988 | Theliander et al. . |
| 4,779,528 | 10/1988 | Bruke . |
| 4,781,842 | 11/1988 | Nicholson . |
| 4,852,269 | 8/1989 | Glorioso . |
| 4,902,431 | 2/1990 | Nicholson et al. . |
| 4,941,132 | 7/1990 | Horn et al. ............ 366/320 |
| 4,981,600 | 1/1991 | Tobler et al. ........ 210/739 |
| 5,013,458 | 5/1991 | Christy, Sr. et al. ........ 210/751 |
| 5,083,506 | 1/1992 | Horn et al. ............ 366/297 |

OTHER PUBLICATIONS

Westphal & Christensen, Lime Stabilization: Effectiveness of Two Process Modifications, Villanova University, Jun. 1982.

EPA, Process Design Manual for Sludge Treatment and Disposal, Sep. 1979.

Christensen, Lime Stabilization of Wastewater Sludges-An Assessment, Villanova University, Mar. 1981.

Westphal & Christensen, Lime Stabilization: Effectiveness of Two Process Modifications, Nov. 1983.

Wallace & Tiernan Series A-758 Cat. File 330.100 Sep. 1989.

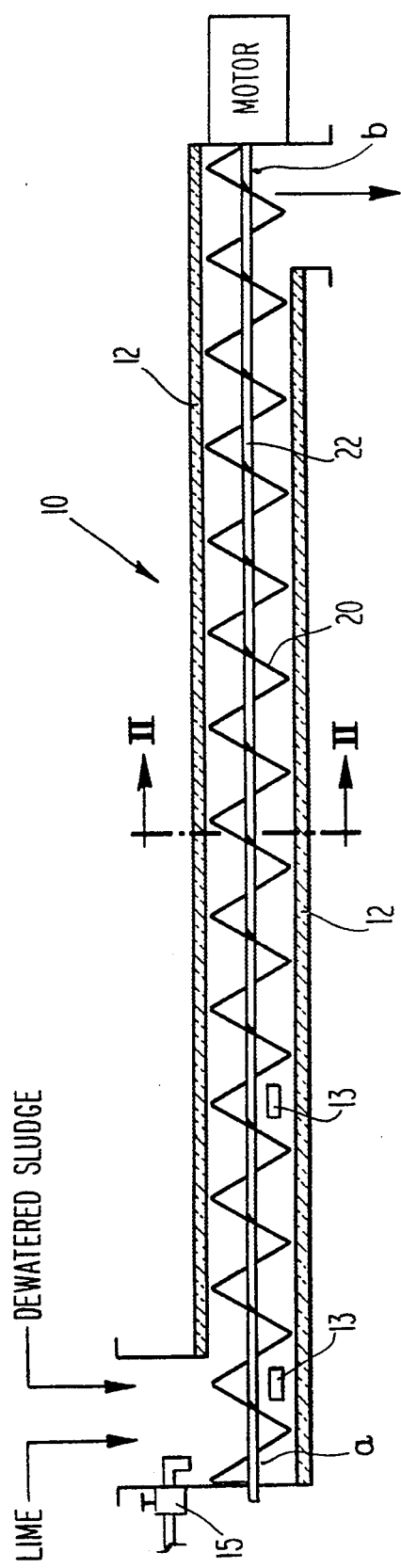
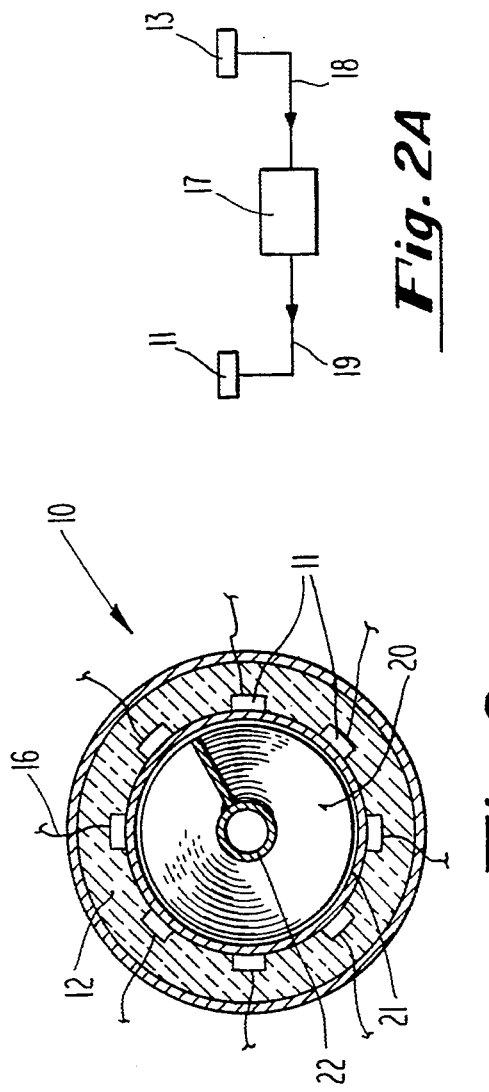

ized as a PSRP or PFRP specifically in Appendix II 40 CFR 257,
PROCESS AND APPARATUS FOR PATHOGEN REDUCTION IN WASTE

CROSS-REFERENCE TO RELATED APPLICATIONS

This is a continuation-in-part of U.S. application Ser. No. 654,781, filed Feb. 13, 1991, now abandoned, and a continuation-in-part of U.S. application Ser. No. 654,789, filed Feb. 13, 1991, abandoned, both of which are continuations of U.S. application Ser. No. 505,938, filed Apr. 6, 1990, now U.S. Pat. No. 5,013,458, the complete disclosure of which is herein incorporated by reference.

This is also a continuation-in-part of U.S. application Ser. No. 954,657, filed Sep. 30, 1992, which, in turn, is a divisional of U.S. application Ser. No. 749,988, filed Aug. 26, 1991, now U.S. Pat. No. 5,186,840, issued Feb. 16, 1993, the complete disclosure of which is herein incorporated by reference.

FIELD OF INVENTION

The present invention generally relates to a process for the treatment of waste prior to disposal. Additionally, the invention relates to an apparatus for the treatment of waste prior to disposal.

BACKGROUND OF THE INVENTION

The safe and sanitary disposal of waste is an ages old problem. Untreated waste, both in solid and liquid form, may contain any number of substances noxious to humans and the environment, including particulate solids, organic and inorganic compounds and pathogens.

It is desirable, therefore, to treat the waste before disposal. The treatment of the waste to destroy pathogens can be accomplished by a number of methods.

One method to treat waste to kill pathogens is to heat it to a high temperature for a period of time. Commonly known as pasteurization, this process neutralizes pathogens to a degree dependent upon the level of temperature and length of time that the waste is exposed to the elevated level.

Pasteurization, while effective to neutralize pathogens, may not reduce the odors emanating from the waste and may not reduce vector attractiveness. In the absence of reduction of vector attractiveness, vectors such as rats, mice and flies, will be attracted to the untreated waste. Vectors pose a health risk by themselves, as well as potentially spreading any pathogens present in the waste. Therefore, any treatment and subsequent disposal must reduce odors and attendant vector attractiveness factors.

One method to reduce vector attractiveness and also neutralize pathogens is by lime stabilization, which elevates the pH of the waste to a sufficient degree, for a sufficient period of time. This method is usually accomplished by the addition of an alkaline substance to the waste. Substances such as calcium oxide or calcium carbonate and compounds consisting of or containing them such as lime or quicklime, lime kiln dust, cement kiln dust, or dolomitic lime are commonly used for this process. The relatively low expense of sufficient quantities of these materials and their high alkalinity makes them well suited to the task.

In addition to the noxious components potentially present in and possible vector attraction to untreated waste, a further disposal problem is presented by the fact that untreated waste rarely is purely solid. Rather it usually has both solid and liquid components, with the solid component further potentially containing some degree of bound liquid, usually water. Thus the percent of liquid in the waste may be a sum of both the free liquid component as well as the liquid bound to the solid component. Due to the presence of both these components, waste may vary from a liquid type consistency and appearance to a thick solid consistency and appearance. The need to deal with this variety of phases complicates treatment and disposal. For example, if the waste has mostly a liquid type consistency, the majority of the free liquid portion of waste is separated out and dealt with through techniques known in the art. The remaining solid portion, or sludge, includes the remaining free liquid water, any bound water and the solid. That sludge, which may have a solids content of from 1 to 4%, then undergoes a further dewatering step by any of a number of processes known in the art. If the waste is of a more solid consistency, then the dewatering is usually done is a single process.

After the waste has been dewatered sufficiently, it is referred to as dewatered sludge, which may have a solids content of anywhere from approximately 10% to 60% with the remainder water. This dewatered sludge is difficult to handle. The varying solids content and percentage of water as bound and free give the sludge physical characteristics ranging from a viscous, colloidal liquid to a dry cake or clay.

The Environmental Protective Agency (EPA) has promulgated regulations for proper treatment and disposal of waste or sludge. To ensure neutralization of pathogens to what it deems an environmentally safe level, the EPA has currently imposed two statutorily defined levels of processes for disposal of waste: Process to Significantly Reduce Pathogens (PSRP); and Process to Further Reduce Pathogens (PFRP). The use of either or both PSRP and PFRP depends upon the use to which the treated waste is to be put. Currently, PFRP result in a greater degree of pathogen reduction and waste treated by PFRP has less restriction surrounding its disposal. Although PSRP and PFRP as currently promulgated in Appendix II to 40 CFR 257 are limited to a few named processes, it is possible to qualify a process for either level by meeting, inter alia, the statutorily defined reduction in pathogens.

U.S. Pat. No. 4,781,842 discloses such an invention. Although the process set forth therein is not named as a PSRP or PFRP specifically in Appendix II 40 CFR 257, the process achieves pathogen reduction to current PFRP mandated levels. It does so by mixing the waste with lime or a lime mixture sufficient to raise the pH to 12 for at least a day, and then drying the lime waste mixture, by a natural or aeration process, for a period of time sufficient to reduce pathogens to the current PFRP regulations set forth in that patent.

The disclosure in the '842 patent is limited to current levels of pathogen reduction necessary to achieve PFRP, however. Changing regulations may lead to changing levels of pathogen reduction and the '842 patent does not seem to be easily adaptable to such a circumstance.

Accordingly, while there are many different methods that are used to stabilize or reduce pathogens in sludge and to condition sludge for reuse, including digestion (aerobic and anaerobic), lime stabilization, chlorine stabilization and composting, and while there are other processes that are used to reduce the volume and to stabilize the sludge, such as heat drying or incineration, such techniques may lend themselves to other problems.

For example, incinerators heat and burn sludge resulting in an ash which has no significant beneficial reuse potential. Heat drying treats the sludge in order to drive off the water contained within the sludge while leaving much organic or inorganic solids intact, with the end product usually being pelletized and used for fertilizer.

The methods used to heat sludges are generally broken down into two categories, direct heating and indirect heating. For direct heating, heat transfer is accomplished by direct contact between the heating medium and the wet sludge, with the heating medium normally being hot air or hot gases.

Indirect heating is accomplished by contact of wet solids with hot surfaces, with the heating medium being normally kept away from the sludge and heating a surface which is in contact with the sludge. The heating medium in such instances is usually hot water, steam, or hot oil.

The amount of heat which can be transferred through indirect methods is a function of the heat transferability of the heat medium, heat transfer surface, and the material to be heated. The amount of heat transferred is formulated as follows:

$$q_{cond} = h_{cond} A (t_m - t_s)$$

where:
$q_{cond}$ = conductive heat transfer, Btu per hour (kJ/hr);
$h_{cond}$ = conductive heat transfer coefficient, Btu per hour per °F. (kJ/hr/°C.);
$A$ = area of heat transfer surface, square feet (m$^2$);
$t_m$ = temperature of heating medium—for example, steam, °F. (°C.)
$t_s$ = temperature of sludge at drying surface, °F. (°C.).

Various methods have been developed to try to optimize total heat transfer. Most of these prior efforts have attempted to increase the surface area in order to increase the total heat transfer.

Prior inventions have often attempted to increase heat transfer primarily by increasing the surface area. Such techniques may, for example, include a hollow rotating shaft in order to move the heating medium through a larger surface area, thereby providing an increase in total heat transfer. Variations and improvements on such have included the addition of hollow disks on the rotating shafts, in order to get the heating medium to the exterior of the shaft.

The use of hot water as a medium is restricted to 212° F. (100° C.). At 212° F., the temperature differential ($t_m - t_s$) is very small. As a result, total heat transfer is extremely low. To overcome this restriction, steam may be used to allow for higher heat medium temperatures. Alternatively, oil can also be used. Above 250° F., steam develops pressures in excess of 15 psig. At this point, special constructions such as A.S.M.E. coding of all fabrication must be done for proper safety. In addition, once pressure is utilized, leaks can occur which allow the heating medium to escape into the sludge. Leaks cause not only loss of pressure and heat, but also contaminate the sludge or material being heated.

This invention teaches a method and apparatus which increases the temperature differential ($t_m - t_s$) in order to increase the total heat transfer. The invention provides for an economical, high temperature method of heating the rotating mechanism to indirectly heat and to mix sludges with other material.

This invention thus provides a means to eliminate a fluid heat medium, avoiding elevated pressures and the possibility of leakage and contamination.

Accordingly, it is an object of the present invention to provide an apparatus and method to achieve currently mandated levels of PSRP and PFRP.

It is a further object of the present invention to provide an apparatus and method to achieve different levels than current regulations mandate of pathogen reduction in waste.

It is a further object of the present invention to provide a method and apparatus to achieve effective neutralization of pathogens in waste.

A further object is to provide an apparatus capable of both stabilizing and pasteurizing raw sludge in a low cost, time-efficient manner.

It is thus a further object of this invention to accomplish the above objects, wherein a method and apparatus is provided for adding supplemental heat to the sludge which indirectly heats the sludge by heat generated through electric elements.

Further objects and advantages, such as sensing the temperature of the sludge and controlling the amount of heat via a feedback control, by the placement of heat elements within either the mixing member, such as within a rotating cylindrical member, or by placing the heating elements outside or inside the walls of a chamber, are also provided.

SUMMARY OF THE INVENTION

According to the present invention, a sufficient quantity of lime is added to dewatered sludge, to raise the pH to a predetermined level and for a predetermined period of time in order to neutralize pathogens present in the sludge and reduce vector attractiveness. Furthermore, the heat of the lime-sludge reaction is retained and the measure of additional heat is added by indirectly heating the sludge by heat generated through electrical elements, so that the temperature of the lime-sludge mixture is raised to a predetermined level for a predetermined period of time for further neutralization of pathogens.

Apparatus for performing the method is also disclosed.

BRIEF DESCRIPTION OF THE DRAWINGS

FIG. 1 is a schematic illustration, in side elevation, of a preferred apparatus embodying the invention.

FIG. 2 is a fragmentary section through FIG. 1, wherein the electric heating elements are shown, located outside the interior wall of the chamber, on an exterior surface thereof, with suitable wiring connections for delivery of electric current thereto.

FIG. 2A is a schematic illustration of a feedback circuit, by which sensors operate through a controller to control the voltage/amperage electrically provided to heat elements.

DESCRIPTION OF THE PREFERRED EMBODIMENTS

Figure 3:
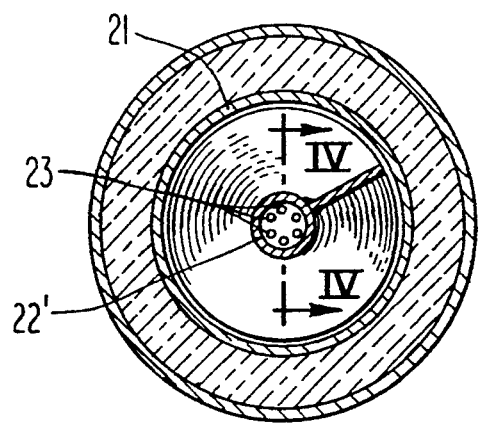
FIG. 3 is a sectional view similar to that of FIG. 2, but wherein heat elements are shown, located inside the shaft of the mixing member.

In the preferred embodiment, dewatered sludge and an additive, usually lime, are deposited in a continuous stream to a chamber. They are thoroughly mixed when deposited, so the pH of the sludge begins to rise, stabilizing at or above the desired level which in the preferred embodiment is a pH of at least about 12. The process is then continued for the desired dwell time and is monitored to ensure it is maintained at about or above the desired level.

The mixing of the sludge and lime, at atmospheric conditions, leads to hydration reaction:

$$CaO + H_2O = Ca(OH)_2 + Heat$$

Using stoichiometric quantities in the reaction gives:

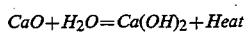

as well as releasing 27,500 BTU's per pound mole.

Although lime (defined here as substantially pure calcium oxide) is utilized in this embodiment, other substances consisting of or containing calcium oxide or calcium carbonate, or calcium hydroxide, may be used, such as quicklime, dolomitic lime, or lime kiln dust, cement kiln dust. Therefore, although lime is used herein, the additive is selected from the group comprising or consisting of calcium oxide, calcium carbonate and calcium hydroxide. The selection may be dependent on availability and pH level desired, because some members of the group may not be effective enough to raise the pH to the desired predetermined level. For example, if the desired predetermined pH level is twelve, dolomitic lime may not be volatile enough to raise the mixture to that level.

The dewatered sludge may contain anywhere from 10–60% of dry solids, although 15–50% is more usual. The lime-sludge ratio, by weight, can vary from 25% to 200%, so that for every pound of dry solids of sludge, from 0.25 to 2.0 pounds of lime may be added. As this equation shows, the hydration of the lime requires water. The free (and perhaps some or all of the bound) water in the dewatered sludge is utilized in the reaction.

The resultant hydroxide, which in this embodiment is $Ca(OH)_2$, is the alkali utilized to elevate the pH of the sludge, and so cause lime stabilization. Elevation of the pH occurs quickly, and the sludge then remains at or above a predetermined level for a predetermined period of time. In the preferred embodiment the pH rises quickly to above 12. At about two hours the sludge is withdrawn and is tested to ensure it is at least about 12.

The predetermined period of time that the sludge dwells in the chamber is, in the preferred embodiment, at least two and a half hours during which, for the first about two hours, the sludge is at or above a pH of about 12. However, it should be noted that the dwell time is able to be shortened or lengthened. It can be as long as a number of days, or even weeks, depending on the degree of lime stabilization desired. The longer the dwell time, the greater the degree of stabilization. Additionally, the desired pH level may decrease over time, so that, for example, during a 24 hour dwell time, a pH of greater than or about 12 may be reached after 2 hours, and then, after 22 more hours, the pH may decline to at least about 11.5. The dwell time may also be shortened to be less than the two and one half hours. The lime may then be transferred to another container or location. In an alternative preferred embodiment, the pasteurization is deemed to occur contemporaneously with the lime stabilization, and the dwell time is about thirty minutes. The pH is monitored at the end of two hours after initial mixing of the lime and sludge to ensure that it has remained at about or above 12. The temperature would be monitored for the initial at least about a half hour, to ensure it remains at about or above the desired 70° C. A further alternative is to monitor the temperature during the desired half hour pasteurization period at any time during the two hour time of lime stabilization.

In the first preferred embodiment having a two and one half hour dwell time, the sludge is exposed, after the two hour lime stabilization, for at least a half hour more to the elevated temperature of the chamber, caused by the heat released from the reaction and retained in the chamber. The chamber itself is substantially closed, which assists in retaining the sludge at least a substantial amount of the heat released during the hydration reaction.

Although the preferred embodiment utilizes a single chamber to retain the sludge during pasteurization and lime stabilization, it is possible to have the steps occur in separate chambers and have the sludge pass through to each. It is also possible for the process to occur without any enclosure in a chamber, or partial enclosure during the process, as long as heat from the hydration reaction is retained within the sludge.

In the preferred embodiment enough heat is retained in the sludge during the course of the ongoing hydration reaction to maintain a temperature of at least about 70 degrees Celsius for at least 30 minutes and thereby pasteurize the sludge. It is also preferred to insulate the chamber to retain the heat in order to effect efficient pasteurization as well as increase the reaction rate. An increase in the temperature of 10° C. Celsius, for example, may double the reaction rate. A doubled reaction rate provides for increased heat and therefore temperature which in turn provides itself for a potentially further increase in temperature and as a result, further increase in reaction rate. This is a "snowball" or "avalanche" effect. If the heat is not released from the reaction in sufficient quantities to enable the sludge to reach the desired temperature, supplemental heat may be added.

The addition of supplemental heat may also be necessary because although a substantial amount of heat is released during the hydration reaction, excess water in the chamber may absorb the heat. It may be possible to bleed off or release some of the excess water, or use it in slaking the lime (which usually requires three parts water to one part lime), but the amount remaining may still absorb undesirable quantities of heat. For example, if 0.25 pound lime is added to every 1 pound sludge, and the sludge used has 15% solids content, then approximately 252 pounds of water will be released from the sludge during the reaction of stoichiometric quantities of lime and sludge. Insofar as 27,500 BTU's per pound mole are released during the reaction, the excess water will potentially absorb much of the heat released. Therefore, supplemental heat may be desirably added by controllable means. Note that, if the means are not controlled, due to the varying nature of the components, heat far in excess of that needed may be produced. For example, assuming that 2 pounds of lime are added to every 1 pound of sludge (in a 2:1 ratio) and the sludge utilized has 50% solids content, then only 18.5 pounds of water will be released by the sludge. This is barely enough for the hydration reaction to occur, and will lead to almost the entire 27,5000 BTU's released in the reaction being utilized to heat the mixture. In this instance, little, if any supplemental heat may be necessary to reach desired or pasteurization temperature.

Because in the preferred embodiment the reaction is an ongoing one, operating continuously, sludge is introduced into the chamber where mixing occurs in a continuous stream, on a first-in, first-out basis, so that the beginning of the continuous stream introduced into the chamber is also the first to leave the chamber, after it has spent the desired dwell time in the chamber. This continuous stream may contain varying degrees of dewatered sludge, within 10-60% solids content range. As the sludge dwells in the chamber, monitoring the pH and the temperature of the sludge is desirable to ensure that the predetermined levels of pH and temperature are achieved and maintained during the dwell time in the chamber. If the levels are not achieved or maintained, additional lime may be added to raise the heat and temperature through hydration. If necessary, additional water can also be added, if sufficient amounts are not present in the sludge. Also, supplemental heat may of course be applied to the sludge.

In the preferred embodiment, the sludge is also preheated before being mixed with the lime. This preheating, which could potentially be of the lime as well, allows the reaction to occur more efficiently, because less released heat from the hydration reaction is then necessary to be utilized to achieve the desired temperatures. Additionally, the availability of additional heat provides the ongoing "snowball" type of reaction discussed earlier.

It is important to note that the heterogeneous character of sludge, as well as the variables in the lime utilized, for example the purity, may lead to some variation in the stoichiometric equation and therefore the reaction. Also, the rate at which the reaction occurs is dependent upon a number of factors. For example, preheating of the lime or sludge, before they are dumped in the chamber, will lessen the heat necessary to reach the preferred 70° C. temperature. Also, the particle size of the utilized lime will also affect the rate of hydration as well as the rate of pH change. A very fine (pulverized) lime will materially improve the hydration rate. Yet the storage and treating of a very fine lime is more difficult than a grosser composition.

At FIG. 1 is shown an apparatus embodying a preferred embodiment of the invention. Lime and dewatered sludge are dumped into the substantially closed chamber 10. The chamber 10 is a mixer, having an elongate generally helically shaped screw 20 driven by a motor. The screw 20 is retained within a generally cylindrical housing which serves as a chamber and as a mixer as well. It is also possible to use any other form of conveyor known in the art (and modified to reflect the present invention) as long as mixing occurs. For example, a flight screw conveyor, a hollow flight conveyor or a helical conveyor all may be used and the number of actual screws may vary. Two or more within the same chamber may be used.

As the lime and sludge travel from point "a" to point "b" they are mixed continuously. The hydration reaction occurs upon mixing and at least a substantial amount of the heat released during the reaction is retained within the sludge. Use of the screw conveyor also permits treatment of the sludge on the preferred first-in, first-out basis. Additionally, use of a screw conveyor also permits the desired dwell time, or the time required for the sludge to travel from point "a" to point "b" to be easily set, by merely adjusting the speed of the screw. Furthermore, supplemental heating of the sludge, if desired, is easily done as shown at FIG. 2. Heat elements, which provide supplemental heat to the sludge, are shown generally at 11 are placed around the conveyor shell 21. Insulation 12 is then wrapped around the heat elements 11. The heat elements 11, of a type known in the art, run the entire length of the conveyor 10 in a manner shown, and can be electrical resistance type elements, electric infrared elements, electric quartz elements or any other suitable electric elements that will provide the desired heat. This permits heating of the sludge during its travel through the conveyor. The insulation 12 also of a type known in the art, runs the entire length of the conveyor as well. The insulation 12 and heat elements 11 may be desirably combined in a unit or heat jacket for ease of assembly. The insulation 12 may also, in an embodiment not shown herein, be located on and run the entire length of the conveyor without any supplemental heat source.

Alternately, although this is not shown, the screws 20 of the conveyor on the shaft 22 on which they are carried can be hollow, and steam, hot air or hot water could be transported therethrough for a supplemental heat source.

Returning to FIG. 1, the monitors 13 serve to monitor the temperature to ensure that the desired, predetermined level of temperature is maintained. They may be placed wherever monitoring is desired. The monitors are any sort of thermometer, thermocouple, or other sensor known in the art including a tracking thermometer to view the temperature over time.

The pH may also be monitored during the dwell time of the sludge mixture. In the preferred embodiment, the monitoring is accomplished by withdrawal of a sample of sludge from the conveyor, from an access port (not shown), after about two hours. The sample is tested by a conventional type of pH sensor or meter known in the art to ensure it is at or above the desired level of about 12.

A spigot 15 is also shown, which permits the addition of additional water if desired for the reaction. Spigots may be located throughout the conveyor if desired, in a manner not shown here.

It will be apparent from the foregoing, that while the specific illustrations of chambers are chambers in which a single auger, only, is illustrated in the chamber, the present invention is equally adapted to placing electric heating elements in a multiple auger chamber, or inside the shafts of multiple augers in a chamber that holds two or more such augers, as is the case in U.S. Pat. No. 5,186,840, incorporated herein by reference, and that the claims of this invention cover either single-auger or multiple-auger chambers.

With specific reference to FIG. 2, it will be seen that the heating elements 11 are shown outside the cylindrical shell 21, but carried thereagainst, in order to provide heat to the sludge within the inner wall of the chamber shell 21, thus indirectly heating the sludge within the shell 21 via electric heating, with the electric supply for providing current to the heating elements 11, being provided via electric wires 16, from any suitable A.C. or D.C. source.

With reference to FIG. 2A, it will be seen that the thermocouples 13, or other suitable detection elements, are connected to a suitable feedback control member 17, via line 18, which in turn is connected via line 19, to a representative heating element 11, it being understood that a plurality of such connections 19 to heating elements 11 will be provided.

Figure 4:
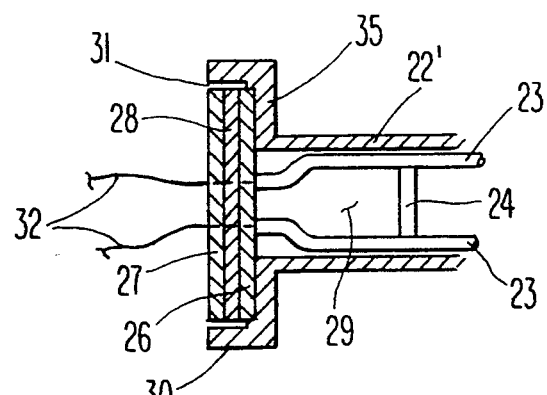
FIG. 4 is an enlarged longitudinal sectional view, taken generally along the line IV—IV of FIG. 3, wherein the electrical elements inside the shaft of the mixing member, and their connection to a stationary member outside the shaft, are shown at the left end thereof, with the shaft of the mixing member being only fragmentally illustrated.

With reference now to FIG. 3, it will be seen that an alternative embodiment is provided to that of FIG. 2, in which the heating elements 23 are longitudinally disposed within the shaft 22', rather than outside the periphery of the shell 21 as is the case in FIG. 2. As is more specifically shown in FIG. 4, the elements 23 are disposed along the inside wall of the shaft 22' of the mixing member, and pass through an end plate 26 carried for rotational movement with the shaft 22' and its end flange 25, with such "passing through" of the wiring 32 for the heating elements 23 being shown in phantom, such that the wiring 32 passes through a suitable slip plate 28, or like conventional means, to in turn pass through a stationary, non-rotational end plate 27, and on to a source of power. The construction of the wiring passing through the plates 26, 27 and 28, may be in the form of a slip plate as indicated herein, or may be in the form of any conventional device for making electrical connections from the wiring of a fixed member, to electriconnections in a rotating member; such devices being conventionally available in the art. It will further be noted that the elements 23 are supported by suitable spacing disks 24, only one of which is shown along the length of the shaft 22', but it will be understood that a plurality of such spacing disks 24 will be disposed at various locations along the interior of the shaft 22'. In the embodiment of FIG. 4, it will be noted that the disks 24 support and hold the heat elements at the perimeter of the shaft, and that by attachment of the end flange 26 to the flange 25 at the end of the shaft, the elements 23 may expand longitudinally within the shaft 22', as may be necessary as they heat up. In this embodiment, the assembly as shown in FIG. 4 may readily be inserted into the central shaft 22' of the rotating auger, to allow for quick and easy maintenance and replacement of the entire assembly, if need be. In an alternative embodiment, it may be desired to fill the central cavity 29 of the shaft 22' with oil or another heat medium, preferably of the liquid type, which would be used to increase the heat transfer between the elements and the rotating auger.

Figure 5:
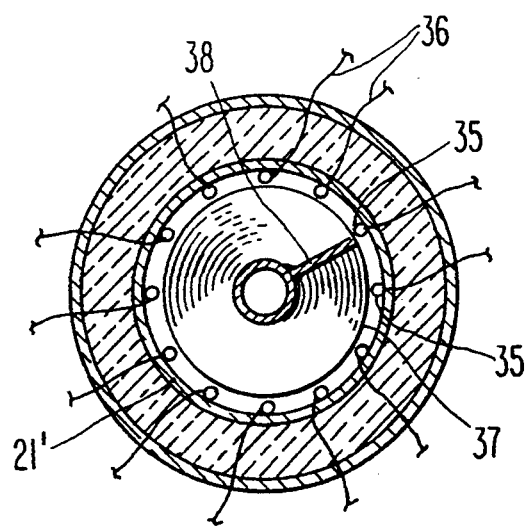
FIG. 5 is a sectional view similar to that of FIGS. 2 and 3, but wherein the electric heating elements are shown inside the interior wall of the chamber, but outside the mixing member.

With reference to the embodiment of FIG. 5, yet another alternative arrangement is provided, relative to that illustrated in FIG. 2, for having the heating elements 35 carried by a cylindrical shell 21', but in the arrangement of FIG. 5, the heating elements 35 are disposed on the inside wall of the inner housing or shell 21, for indirectly heating the sludge disposed inside the shell 21, as the sludge is mixed by a rotating mixer 38 disposed therein, and with the elements 35 being provided with electrical power via electric lines 36, as shown in FIG. 5.

The above description and the views depicted by the Figures are for purposes only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the appended claims.

What is claimed is:

1. A process for treatment of sludge, which comprises:
   (a) mixing dewatered sludge with a solids content in the range of 10–60% with an additive selected from the group consisting of calcium oxide, calcium carbonate and calcium hydroxide to generate and release heat, including supplying said additive present in sufficient quantity to adjust the pH of the sludge to at least about 12;
   (b) retaining within the sludge at least a substantial amount of the heat released during the mixing by maintaining the sludge in a substantially closed chamber at an elevated temperature;
   (c) applying supplemental heat to the sludge; and
   (d) wherein the step of applying supplemental heat comprises indirectly heating the sludge by heat generated through electrical elements.

2. The process of claim 1, wherein the step of applying supplemental heat includes preheating the sludge prior to mixing.

3. The process of claim 1, wherein the step of applying supplemental heat includes heating the sludge while mixing the sludge.

4. The process of claim 1 wherein the step of applying supplemental heat includes preheating the sludge prior to mixing, and also heating the sludge while mixing the sludge.

5. The process of claim 1, further including the step of monitoring the temperature of the sludge.

6. The process of claim 5, including controlling the amount of supplemental heat applied to the sludge as a feedback function of the temperature of the sludge as determined by monitoring the sludge temperature.

7. The process of claim 1, wherein the mixing occurs in an elongate chamber having at least one elongate mixing member disposed therein, with the mixing member including an elongate, generally central rotatable shaft; and supplementally heating the sludge through heating elements carried by said shaft for rotation therewith during mixing.

8. The process of claim 7, wherein the heating elements are carried inside said shaft.

9. The process of claim 7, including supplying non-rotating electrical power supplying means external to said shaft, in electrical connection to rotatable elements carried by said shaft.

10. The process of claim 1, wherein the mixing occurs in a chamber with at least one mixing member disposed therein; with the supplemental heating being provided from heating elements being carried by said chamber.

11. The process of claim 10, wherein said chamber has an inside wall against which the sludge is mixed; said wall having an outside surface and an inside surface; with the supplemental heating being provided from heating elements disposed against the inside surface of said inside wall.

12. The process of claim 10, wherein said chamber has an inside wall against which the sludge is mixed; said wall having an outside surface and an inside surface; with the supplemental heating being provided from heating elements disposed against the outside surface of said inside wall.

13. The process of claim 5, including controlling the amount of supplemental heat applied to the sludge as a feedback function of the temperature of the sludge as determined by monitoring the sludge temperature, wherein the mixing occurs in an elongate chamber having at least one elongate mixing member disposed therein, with the mixing member including an elongate, generally central rotatable shaft; and supplementally heating the sludge through heating elements carried by said shaft for rotation therewith during mixing.

14. The apparatus of claim 1, wherein the means for retaining includes means for maintaining the sludge in the substantially closed chamber at at least about 70° C. for at least about one-half hour.

15. The process of claim 1, wherein the retaining step includes maintaining the sludge in a substantially closed chamber at at least about 70° C.

* * * * *